United States Patent [19]

Oetiker

[11] Patent Number: 5,070,580
[45] Date of Patent: Dec. 10, 1991

[54] EXTERNALLY STRENGTHENED CLAMP STRUCTURE

[76] Inventor: Hans Oetiker, Oberdorfstrasse 21, CH-8812 Horgen, Switzerland

[21] Appl. No.: 567,085

[22] Filed: Aug. 14, 1990

[51] Int. Cl.5 .............................................. B65D 63/04
[52] U.S. Cl. .................... 24/20 TT; 24/20 R; 24/20 CW
[58] Field of Search ......... 24/20 TT, 20 CW, 20 EE, 24/20 R, 23 R, 23 W, 23 EE, 484

[56] References Cited

U.S. PATENT DOCUMENTS

| 2,056,180 | 10/1936 | Flood | 24/23 W |
|---|---|---|---|
| 2,614,304 | 10/1952 | Oetiker | 24/20 CW |
| 3,082,498 | 3/1963 | Oetiker | 24/20 CW |
| 3,237,256 | 3/1966 | Young | 24/16 PB |
| 3,455,336 | 7/1969 | Ellis | 24/16 PB |
| 4,103,399 | 8/1978 | Oetiker | 24/23 R |
| 4,430,775 | 2/1984 | Arthur | 24/20 CW |

FOREIGN PATENT DOCUMENTS 0280598 8/1988 European Pat. Off. .

*Primary Examiner*—Victor N. Sakran
*Attorney, Agent, or Firm*—Paul M. Craig, Jr.

[57] ABSTRACT

A clamp structure with one or several plastically deformable ears whose holding ability is increased by an external strengthening member surrounding the plastically deformable ear in its non-deformed condition; the lateral portions of the strengthening member are thereby so constructed and shaped that an application of a force to the lateral members will cause the ear to be plastically deformed.

29 Claims, 1 Drawing Sheet

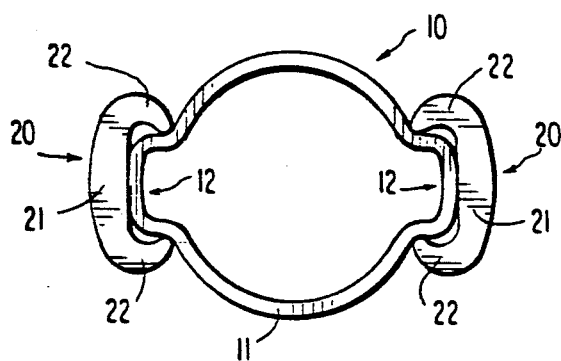
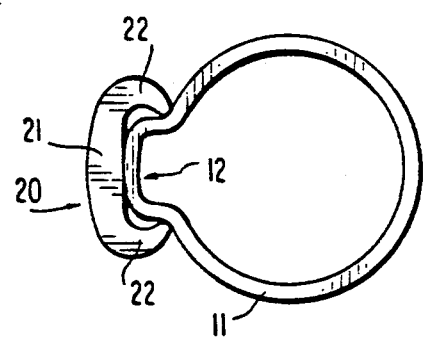
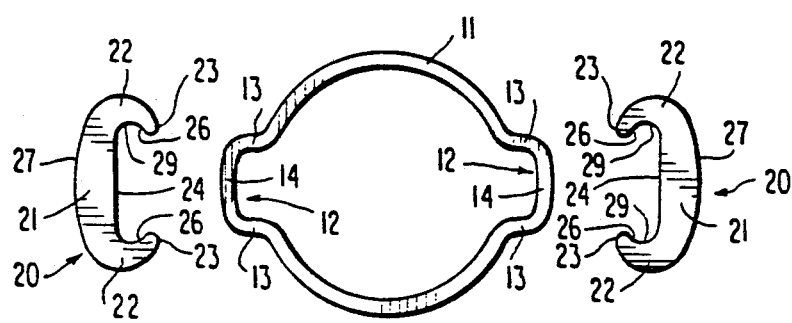
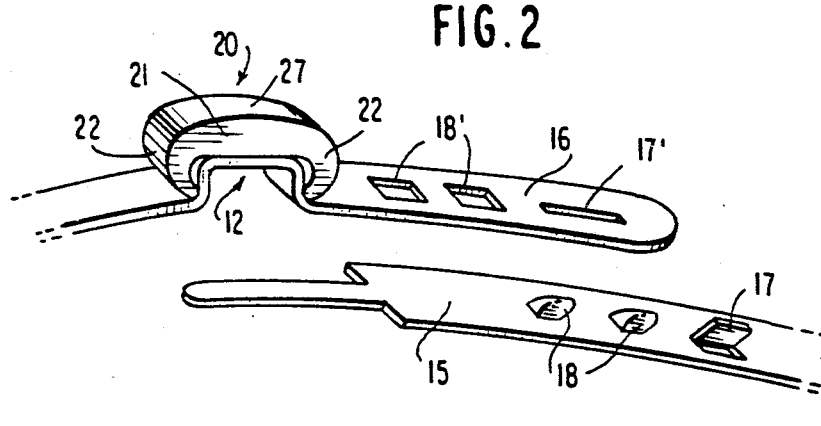
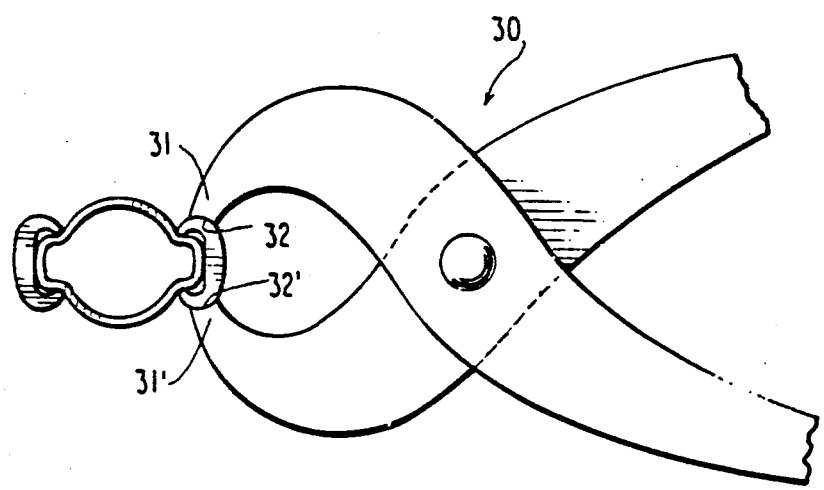

EXTERNALLY STRENGTHENED CLAMP STRUCTURE

The present invention relates to an externally strengthened clamp structure, and more particularly to a clamp structure whose holding ability is increased by a strengthening member mounted over a plastically deformable ear.

BACKGROUND OF THE INVENTION

Clamp structures provided with so-called "Oetiker" ears have enjoyed enormous commercial success over the past several decades. These clamp structures may be two-ear clamp structures made from tubular stock, as shown in my prior U.S. Pat. No. 2,614,304, one-ear clamp structures made from tubular stock as shown in my prior U.S. Pat. No. 3,082,498, open clamp structures adapted to be interconnected by a bridging portion provided with an "Oetiker" ear as shown in my prior U.S. Pat. No. 2,847,742, or open clamp structures provided with mechanical interconnecting means as disclosed in my prior U.S. Pat. Nos. 3,475,793; 3,523,337; 4,103,399 and 4,237,584. Whereas the holding ability of open-type clamp structures depends both on the mechanical interconnection of the open ends of the clamping band as well as on the holding ability of the ear, the holding ability of the clamp structures made from tubular stock such as shown in my prior U.S. Pat. No. 2,614,304, apart from strength considerations of the clamping band, depends on the holding ability of the plastically deformable "Oetiker" ear. This, in turn, depends on the type of material and thickness of the clamping band as well as on the design of the ear itself. Efforts to increase the holding ability of such clamp structures by the use of reinforcing grooves, as disclosed in my prior U.S. Pat. No. 3,402,436 and in my copending U.S. application Ser. Nos. 06/922,408 and 06/922,473, filed Oct. 22, 1986 and Oct. 23, 1986, respectively have greatly increased the holding ability of clamp structures. However, in some applications, it is desirable to still further increase the holding ability of the clamp structure, i.e., the force with which the clamp structure can be closed so as to avoid leakages in the event of changes in temperature and/or pressure of the fluid carried by the hose which is secured by the clamp structure, for example, on a nipple. The ability of the clamp structures with so-called "Oetiker" ears to compensate for changes in temperature and/or pressure by the residual elasticity in the plastically deformed ear is one of the important advantages obtainable with the clamp structures disclosed in my prior patents. However, the desire to increase the holding ability while maintaining effective automatic compensation for temperature and/or pressure is a requirement that is fraught with some contradiction. My prior Swiss Patent 580,247 disclosed an arrangement pursuant to which the plastically deformed ear can be subjected only to a predetermined maximum reopening force. However, the force required for reopening the ear up to its maximum limit is unaffected by this arrangement.

The U.S. Pat. 3,087,221 proposed a hose clamp in which the clamping band had its greatest radial thickness near its middle with the thickness progressively reduced towards its ends in order to maintain a true circle initially and upon change of diameter. In FIG. 3 of this patent, the ear itself was also proposed to be made in the same manner as the clamping band, i.e., having its greatest thickness in the middle with reduced thickness toward the ends of the ear. Apart from a lack of disclosure of how the clamps as proposed in this patent can be realized in practice, this patent was concerned only with maintaining a true circular configuration of the parts in question.

The European Patent 0 280 598 discloses an arrangement for a clamp structure provided with an outwardly extending circular fold or loop in the clamping band in which the elasticity reserve is to be determined by a slotted sleeve surrounding the fold or loop. However, this patent is concerned with limiting the elasticity reserve in a fold or loop of the type shown in FIG. 1 in my prior U.S. Pat. No. 3,475,793 in which bent-out lugs or folds 2 constitute tensional spring elements. Thus, according to this European patent, the tensional spring reserve of such folds made from intentionally elastic spring steel material is to be limited by the use of the sleeve, whereas the present invention is concerned with problems arising out of the use of so-called "Oetiker" ears made from plastically deformable band material.

SUMMARY OF THE INVENTION

The present invention, by contrast, is concerned with strengthening the holding ability of a clamp structure provided with a plastically deformable so-called "Oetiker" ear whose holding ability is considerably increased by an external strengthening member which causes the plastically deformable "Oetiker" ear to be deformed in the usual manner when a deformation force is applied to the strengthening member by a special tool. The use of the external strengthening member adapted to be mounted over the "Oetiker"-type ear prior to its plastic deformation gives greater freedom in the choice of the material used for the clamping band which normally also constitutes the material from which the plastically deformable ear is made. The strengthening member is thereby made in such a manner that it can be readily mounted over the non-deformed "Oetiker" ear whereby the convexly curved, tapering lateral portions of the strengthening member engage the ear much in the same manner as these ears were previously engaged by the pincer-type tools used for the plastic deformation thereof. The thickness of the strengthening member can thereby be chosen at will, preferably being a multiple of the thickness of the clamping band.

The present invention thus provides a clamp structure with considerably increased holding ability while still retaining some elasticity to compensate for changes in temperature and/or pressure. Additionally, the clamp structure as such can be continued to be manufactured on existing machinery. Furthermore, the strengthening member can be readily machined from stock of any desired material by the use of programmable machine tools which are commercially available today.

BRIEF DESCRIPTION OF THE DRAWINGS

These and other objects, features and advantages of the present invention will become more apparent from the following description when taken in connection with the accompanying drawing, which shows, for purposes of illustration only, several embodiments in accordance with the present invention, and wherein:

FIG. 1 is a side elevational view of a two-ear clamp structure made from tubular stock provided with an external strengthening member mounted over each ear in accordance with the present invention;

FIG. 2 is a side elevational view showing the clamp structure and strengthening members of FIG. 1 prior to mounting the same over the plastically deformable ears;

FIG. 3 is a side elevational view, similar to FIG. 1, illustrating the present invention with a one-ear clamp structure made from tubular stock;

FIG. 4 is a partial side elevational view of an open-type clamp structure provided with an external strengthening member mounted over the ear in accordance with the present invention; and FIG. 5 is a somewhat schematic elevational view of a pincer-like tool for use with the present invention.

DETAILED DESCRIPTION OF THE DRAWINGS

Referring now to the drawing wherein like reference numerals are used throughout the various views, and more particularly to FIGS. 1 and 2, reference numeral 10 generally designates a two-ear clamp structure of the type disclosed in my prior U.S. Pat. No. 2,614,304 which includes a clamping band 11 made from tubular stock including two plastically deformable so-called "Oetiker" ears generally designated by reference numeral 12. Each ear 12 includes two leg portions 13 interconnected by a bridging portion 14. The bridging portion 14 may be provided with a reinforcing groove as shown in my prior U.S. Pat. No. 3,523,337 or as disclosed in my aforementioned copending applications. However, the existence of the external strengthening member generally designated by reference numeral 20 would normally obviate the need for the reinforcing grooves. The strengthening member 20 includes main portion 21 and two lateral portions 22. The two lateral portions 22 which are convexly curved, taper in the direction toward the free ends which terminate in rounded-off end portions 23 having a radius of curvature preferably smaller than the radius of curvature of the transition from the clamping band 11 into the leg portions 13. The main portion 21 of the strengthening member 20 is thereby made of a thickness which is significantly greater than the thickness of the clamping band, i.e., is a multiple of the thickness of the clamping band. The thickness of the main portion can thereby be made thinner or thicker depending on the required strength for tensional forces expected in the clamping band. The internal surface 24 of the main portion 21 is thereby substantially rectilinear, passing over into the internal surfaces 26 of the lateral portions 22 by way of rounded-off portions 29 of relatively small radii of curvature. The external surface 27 of the main portion is preferably slightly convexly curved so that the maximum thickness of the main portion occurs near the middle thereof. However, the external surface 27 can also be made substantially parallel to the internal surface 24.

The clamp structure shown in FIGS. 1 and 2 is tightened about an object to be fastened thereby, such as a hose to be fastened about a nipple, by applying a deformation force onto to the lateral portions 22 of the strengthening member 20 which in turn will cause deformation of the plastically deformable ear 12 to assume an approximately omega shape. The maximum force with which the strengthening member 20 can be closed, i.e., the maximum tightening force which can be applied to the clamp structure of FIGS. 1 and 2, then depends on the tensile strength of the material used for the clamping band 11 which is then determined by the force causing the clamping band to tear. By the same token, the holding ability of the clamp structure is determined by the force with which it can be tightened, which is greatly increased by the existence of the external strengthening member 20. On the other hand, the design of the external strengthening member is such that it does not totally eliminate the residual elasticity of the plastically deformed ear to compensate for changes in temperature and/or pressure. In one embodiment according to the present invention, the force could be increased by a factor of 5 to 6 times the maximum force usable with a typical prior art 2-ear clamp of the same construction.

FIGS. 1 and 2 illustrate a two-ear clamp structure which, notwithstanding the presence of the external strengthening members, remains balanced so that it can also be used in rotating applications. Where balance is of little importance, for example, in stationary applications, and in particular where space conditions do not permit the use of a two-ear clamp, the present invention is equally applicable to a one-ear clamp made from tubular stock a shown in FIG. 3 in which similar reference numerals are used as in FIGS. 1 and 2.

FIG. 4 illustrates the application of the present invention to an open-type clamp structure in which the overlapping inner and outer overlapping clamping band ends 15 and 16 of the clamping band 11 are provided with a mechanical interlock. Normally, the mechanical interlock also has a limiting effect on the tightening force which can be applied to the plastically deformable ear before there is a danger of reopening of the clamp structure when the mechanical interlock tears open. However, recent developments in the mechanical interlock, as disclosed in my prior U.S. Pat. No. 4,622,720 have greatly increased the strength of the mechanical interlock so that use of the external strengthening member with open clamps also becomes a reality. The mechanical interlock as disclosed in the U.S. Pat. No. 4,622,720 includes a tab-like member 17 pressed out of the inner band portion 15 and extending in the longitudinal direction of the clamping band 11 as well as one or several cold-deformed support hooks 18 also pressed out of the inner band portion 15 whereby the tab-like member 17 is adapted to engage in a slot-like opening 17' provided in the outer band portion 16 and the support hook or hooks is or are adapted to engage in a corresponding number of openings 18' provided in the outer band portion. For further details of the mechanical interconnection, reference is made to my aforementioned U.S. Pat. No. 4,622,720.

A pincer-like tool generally designated by reference numeral 30 is illustrated in FIG. 5 which is basically similar to the tool illustrated in my prior U.S. Pat. No. 2,614,305. However, the cheeks 31 and 31' instead of being relatively sharp-nosed, are now wider and provided with rounded-off recesses 32 and 32' generally conforming to the convexly shaped contours of the strengthening member 20 so as to cause the free ends 23 of the strengthening member 20 to cause plastic deformation of the ear 12 in a manner similar to the plastic deformation by the use of the pincer-like tool as shown in my aforementioned prior U.S. Pat. No. 2,614,304.

Because of its increased holding ability, the present invention is of particular interest, for instance, in high pressure hydraulic connections.

While I have shown and described several embodiments in accordance with the present invention, it is understood that the same is not limited thereto but is susceptible of numerous changes and modifications as known to those skilled in the art. For example, the present invention is also applicable to plastically deformable ears in which the leg portions extend at an angle to the radial direction as shown in U.S. Pat. No. 3,106,757. Furthermore, the present invention is also applicable to clamps made from band material and interconnected by a rivet-like connection as disclosed in my prior U.S. Pat. No. 3,286,314. Furthermore, the present invention is also applicable to clamp structures of the so-called stepless type as disclosed in my prior U.S. Pat. Nos. 4,200,012 and 4,315,348. Thus, the present invention is susceptible of numerous changes and modifications, and I therefore do not wish to be limited to the details shown and described herein but intend to cover all such changes and modifications as are encompassed by the scope of the appended claims.

I claim:

1. An externally strengthened clamp structure, comprising clamping band means, at least one plastically deformable ear means including two generally outwardly extending leg portions interconnected by a bridging portion, and further deformable means separate from said clamping band means for externally strengthening the deformable ear means to thereby increase the holding ability of the clamp structure, said further deformable means having a thickness which is a multiple of the thickness of the clamping band means in the ear means, and said further means being adapted to be mounted externally of the ear means and being in operable engagement therewith to effect the increase of the holding ability of the clamp structure.

2. A clamp structure according to claim 1, characterized in that the further means is operable to plastically deform the ear means to tighten the clamp structure upon application of a force to said further means which causes deformation thereof.

3. A clamp structure according to claim 2, characterized in that the further means is so shaped and constructed as to increase the holding ability of the clamp structure yet allows for some elasticity to compensate for changes in temperature and/or pressure.

4. A clamp structure according to claim 3, characterized in that the further means surrounds the ear means over the bridging portion and the leg portions.

5. A clamp structure, comprising clamping band means, at least one plastically deformable ear means including two generally outwardly extending leg portions interconnected by a bridging portion, and further deformable means for increasing the holding ability of the clamp structure, adapted to be mounted externally over the ear means and having a thickness which is a multiple of the thickness of the clamping band means, the further means being operable to plastically deform the ear means to tighten the clamp structure upon application of a force to said further means which causes deformation thereof, the further means being so shaped and constructed as to increase the holding ability of the clamp structure yet allowing for some elasticity to compensate for changes in temperature and/or pressure, the further means surrounding the ear means over the bridging portion and leg portions and including a relatively thick main portion extending approximately in parallel with the bridging portion, said main portion terminating in lateral portions having free ends which come to lie within the area of transition between the clamping band means and the leg portions of the ear means.

6. A clamp structure according to claim 5, characterized in that the lateral portions taper in the direction toward the free ends.

7. A clamp structure according to claim 6, characterized in that the lateral portions are convexly curved.

8. A clamp structure according to claim 7, characterized in that the outer surface of the main portion is slightly convexly curved.

9. A clamp structure according to claim 8, characterized in that the inner surface of the main portion is substantially rectilinear.

10. A clamp structure according to claim 9, characterized in that the inner surface of the main portion is longer than the outer surface of the bridging portion, and in that in the non-deformed condition, the lateral portions are spaced from the leg portions up to the area of the free ends thereof.

11. A clamp structure according to claim 10, characterized in that the inner surface of the main portion passes over into the inner surfaces of the lateral portions by way of relatively small radii of curvature.

12. A clamp structure according to claim 11, characterized in that the free ends of the lateral portions are rounded-off with a radius of curvature smaller than the radius of curvature defining the transition areas.

13. A clamp structure, comprising clamping band means, at least one plastically deformable ear means including two generally outwardly extending leg portions interconnected by a bridging portion, and further deformable means for increasing the holding ability of the clamp structure adapted to be mounted externally over the ear means and having a thickness which is a multiple of the thickness of the clamping band means, the further means including a relatively thick main portion extending approximately in parallel with the bridging portion, said main portion terminating in lateral portions having free ends which come to lie within the area of transition between the clamping band means and the leg portions of the ear means.

14. A clamp structure according to claim 13, characterized in that the lateral portions taper in the direction toward the free ends.

15. A clamp structure according to claim 14, characterized in that the free ends of the lateral portions are rounded-off with a radius of curvature smaller than the radius of curvature defining the area of transition.

16. A clamp structure according to claim 13, characterized in that the lateral portions are convexly curved.

17. A clamp structure according to claim 13, characterized in that the outer surface of the main portion is slightly convexly curved.

18. A clamp structure according to claim 13, characterized in that the inner surface of the main portion is substantially rectilinear.

19. A clamp structure according to claim 13, characterized in that the inner surface of the main portion is longer than the outer surface of the bridging portion, and in that in the non-deformed condition, the lateral portions are spaced from the leg portions up to the area of the free ends thereof.

20. A clamp structure according to claim 13, characterized in that the inner surface of the main portion passes over into the inner surfaces of the lateral portions by way of relatively small radii of curvature.

21. An externally strengthened clamp structure, comprising clamping band means, at least one plastically deformable ear means including two generally outwardly extending leg portions interconnected by a bridging portion, and further deformable means for increasing the holding ability of the clamp structure including a strengthening member separate from the clamping band means and adapted to be mounted externally over and in operable engagement with the ear means, and said further strengthening member having a thickness which is a multiple of the thickness of the clamping band means in the ear means to increase the holding ability of the clamp structure.

22. A clamp structure according to claim 21, characterized in that the strengthening member of the further means surrounds the ear means over the bridging portion and the leg portions.

23. A clamp structure according to claim 21, wherein said clamping band means including the ear means is of uniform thickness while the separate strengthening member includes lateral portions with free ends, the thickness of the lateral portions tapering in the direction towards the free ends.

24. A clamp structure according to claim 23, wherein said strengthening member is in operable engagement with the deformable ear means at the free ends of the lateral portions.

25. A clamp structure according to claim 23, wherein the thickness of the lateral portions is at a minimum within the area of the free ends.

26. A clamp structure according to claim 21, wherein the shape of the strengthening member is different from that of the ear means as viewed in the axial direction of the clamp structure.

27. A clamp structure, comprising clamping band means, at least one plastically deformable ear means including two generally outwardly extending leg portions interconnected by a bridging portion, and further deformable means for increasing the holding ability of the clamp structure including a strengthening member adapted to be mounted externally over the ear means and having a thickness which is a multiple of the thickness of the clamping band means, the strengthening member of the further means including a relatively thick main portion extending approximately in parallel with the bridging portion, said main portion terminating in lateral portions having free ends which come to lie within the area of transition between the clamping band means and the leg portions of the ear means.

28. A pincer-like tool for closing a clamp structure, especially a clamp structure of the type defined in claim 27, characterized in that the free ends of its cheek-like members are provided with recesses at least approximately conforming to the outer surfaces of the lateral portions of the strengthening member.

29. A pincer-like tool according to claim 28, characterized in that each recess is so shaped as to receive substantially without play the corresponding convexly shaped outer surface of the respective lateral portion of the strengthening member.

* * * * *